(12) United States Patent
Cheon et al.

(10) Patent No.: US 11,340,621 B2
(45) Date of Patent: May 24, 2022

(54) OBSTACLE AVOIDING METHOD IN STATE-TIME SPACE, RECORDING MEDIUM STORING PROGRAM FOR EXECUTING SAME, AND COMPUTER PROGRAM STORED IN RECORDING MEDIUM FOR EXECUTING SAME

(71) Applicant: TWINNY Co., Ltd., Daejeon (KR)

(72) Inventors: Hongseok Cheon, Daejeon (KR); Taehyoung Kim, Daejeon (KR); Yongjin Byeon, Daejeon (KR); Jaihoon Lee, Daejeon (KR)

(*) Notice: Subject to any disclaimer, the term of this patent is extended or adjusted under 35 U.S.C. 154(b) by 345 days.

(21) Appl. No.: 16/679,374

(22) Filed: Nov. 11, 2019

(65) Prior Publication Data
US 2020/0174483 A1    Jun. 4, 2020

(30) Foreign Application Priority Data
Nov. 29, 2018    (KR) .................. 10-2018-0151148

(51) Int. Cl.
    *G05D 1/00*    (2006.01)
    *G05D 1/02*    (2020.01)

(52) U.S. Cl.
    CPC ......... *G05D 1/0214* (2013.01); *G05D 1/0217* (2013.01); *G05D 1/0238* (2013.01)

(58) Field of Classification Search
    CPC .............. G05D 1/0214; G05D 1/0217; G05D 1/0238; G05D 2201/02; G05D 1/0212; G05D 1/0274; G05D 1/0289
    See application file for complete search history.

(56) References Cited

U.S. PATENT DOCUMENTS

| | | | |
|---|---|---|---|
| 9,381,916 B1* | 7/2016 | Zhu | G01S 13/867 |
| 10,775,805 B2* | 9/2020 | Thode | B60W 30/095 |
| 10,901,425 B2* | 1/2021 | Trautman | G05D 1/0248 |
| 11,183,174 B2* | 11/2021 | Kwon | G10L 15/16 |

(Continued)

FOREIGN PATENT DOCUMENTS

| | | |
|---|---|---|
| JP | 2004-302622 A | 10/2004 |
| JP | 10-1664575 A | 10/2016 |

(Continued)

OTHER PUBLICATIONS

Fraichard, "Trajectory planning in a dynamic workspace: a 'state-time space' approach," Advanced Robotics, vol. 13, No. 1, pp. 75-94, 1999. (Year: 1999).*

(Continued)

*Primary Examiner* — Peter D Nolan
*Assistant Examiner* — Peter Y Ning
(74) *Attorney, Agent, or Firm* — Revolution IP, PLLC

(57) ABSTRACT

The present invention relates to an obstacle avoiding method in a state-time space, a recording medium storing a program for employing the same, and a computer program stored in a medium for employing the same. More particularly, the present invention relates to an obstacle avoiding method in a state-time space, a recording medium storing a program for employing the same, and a computer program stored in a medium for employing the same, wherein a forward trajectory is calculated on the basis of a safe timed configuration region, when collision is expected while calculating the forward trajectory, a part of the calculated forward trajectory is canceled, and a forward trajectory passing through an interim target is calculated, and thus a time required for calculating is reduced and a trajectory and success rate to the destination target state is ensured so as to obtain improvement in performance.

10 Claims, 3 Drawing Sheets

(56) References Cited

U.S. PATENT DOCUMENTS

| | | | |
|---|---|---|---|
| 11,199,379 B1* | 12/2021 | Lam | F41G 7/2253 |
| 11,199,853 B1* | 12/2021 | Afrouzi | G05D 1/0274 |
| 2007/0156286 A1* | 7/2007 | Yamauchi | G05D 1/0278 |
| | | | 700/245 |
| 2019/0041858 A1* | 2/2019 | Bortoff | B60W 30/06 |
| 2019/0051198 A1* | 2/2019 | Nimmagadda | G05D 1/0066 |
| 2019/0187703 A1* | 6/2019 | Millard | B25J 9/0003 |
| 2019/0286145 A1* | 9/2019 | LaFary | G05D 1/0255 |
| 2020/0189573 A1* | 6/2020 | King | B60W 30/09 |
| 2020/0401148 A1* | 12/2020 | Hong | G05D 1/0088 |
| 2021/0094569 A1* | 4/2021 | Febbo | B60W 60/0013 |

FOREIGN PATENT DOCUMENTS

| | | |
|---|---|---|
| KR | 10-1079197 | 10/2011 |
| KR | 10-1709683 | 2/2017 |
| KR | 10-1840700 | 3/2018 |
| KR | 10-1877488 | 7/2018 |

OTHER PUBLICATIONS

A Note on Two Problems in Connexion with Graphs (E. W. Dijkstra, Numerische Mathematik, vol. 1, No. 1, 269-271, 1959).

A Formal Basis for the Heuristic Determination of Minimum Cost Paths in Graphs_A star (Peter E. Hart, vol. ssc-4, No. 2, 1968).

Online Bidirectional Trajectory Planning for Mobile Robots in State-Time Space (IEEE Transactions on Industrial Electronics, Date of Publication: Aug. 24, 2018).

From Path to Trajectory Deformation (Proceedings of the 2007 IEEE/RSJ International Conference on Intelligent Robots and Systems San Diego, CA, USA, Oct. 29-Nov. 2, 2007).

Thierry Fraichard and Hajime Asama., Inevitable collision states—a step towards safer robots, Advanced Robotics, vol. 18, No. 10, pp. 1001-1024 (2004).

Anthony Stentz., The Focussed D* Algorithm for Real-Time Replanning, In Proceedings of the International Joint Conference on Artificial Intelligence, Aug. 1995.

* cited by examiner

OBSTACLE AVOIDING METHOD IN STATE-TIME SPACE, RECORDING MEDIUM STORING PROGRAM FOR EXECUTING SAME, AND COMPUTER PROGRAM STORED IN RECORDING MEDIUM FOR EXECUTING SAME

CROSS REFERENCE TO RELATED APPLICATION

The present application claims priority to Korean Patent Application No. 10-2018-0151148, filed Nov. 29, 2018, the entire contents of which is incorporated herein for all purposes by this reference.

TECHNICAL FIELD

The present invention relates to an obstacle avoiding method in a state-time space, a recording medium storing a program for employing the same, and a computer program stored in a medium for employing the same. More particularly, the present invention relates to an obstacle avoiding method in a state-time space, a recording medium storing a program for employing the same, and a computer program stored in a medium for employing the same, wherein a forward trajectory is calculated on the basis of a safe timed configuration region, when collision is expected while calculating the forward trajectory, a part of the calculated forward trajectory is canceled, and a forward trajectory passing through an interim target is calculated, and thus a time required for calculating is reduced and a trajectory and success rate to the destination target state is ensured so as to obtain improvement in performance.

BACKGROUND

Autonomous driving robots refer to robots that search for their own surroundings and detect obstacles while searching for the optimal trajectory to a destination by using wheels or legs thereof.

Trajectory planning and obstacle avoidance are major techniques in autonomous driving of moving robots. Robots have to generate a trajectory to a destination and move to the destination without colliding with the surrounding obstacles. A good trajectory means the shortest trajectory where a movement trajectory to a destination is minimum, or a safe trajectory where collisions with surrounding obstacles are minimum.

Generally, safe trajectories are more important in the application field of robot. However, the optimal trajectory may be the shortest while being the safest.

Generally, as a method of ensuring a safe trajectory, there is used a method of determining a direction where an empty space is large
and determining a movement direction of robot by using obstacle detecting sensors installed in the robot (devices measuring a distance with nearby obstacles, such as laser or ultrasonic waves, etc.) and taking into account a direction to a destination. Weights for a direction to an empty space and a direction to a destination are determined experimentally. When a large weight is given to an empty space, collision with surrounding obstacle may be minimized, but a long trajectory may be obtained, and in extreme cases, the robot may not get to the destination. On the contrary, when a large weight is given to a destination, safety is degraded.

A fundamental driving performance of an autonomous driving robot is an intelligent navigation capability of moving along an optimal trajectory to a destination without collisions. For the intelligent navigation capability, a trajectory planning technique and a location recognition technique are required.

Herein, the trajectory planning technique may be classified into global trajectory planning and local trajectory planning.

First, global trajectory planning means searching for an optimal trajectory to a target point by using a given environmental map, and local trajectory planning means avoiding obstacles in real time under a dynamic environment.

In addition, the location recognition technique is a location determining technique where a current location of a robot that is navigating is determined on a map.

As a conventional example of the above global trajectory planning method, typically, for example, a "Dijkstra algorithm" is known which is disclosed in a note on two problems in connection with graphs (E. W. Dijkstra, Numerische Mathematik, Volume 1, Number 1, 269-271, 1959)".

In detail, the Dijkstra algorithm is provided as initial trajectory planning and is widely used in various fields up to now. However, a lot of calculation time is required since the algorithm performs searching in all the spaces.

In addition, as another conventional example of the above global trajectory planning method, for example, an A* algorithm is provided that is disclosed in "A Formal Basis for the Heuristic Determination of Minimum Cost Paths in Graphs_A star (PETER E. HART, VOL. ssc-4, NO 2, 1968)".

In detail, the A* algorithm is a complement to the Dijkstra algorithm, and a searching time is faster than the Dijkstra algorithm by adding an evaluating function on the basis of depth first search and breadth first search. However, real time calculation for the same is difficult.

In addition, as another conventional example of the above global trajectory planning method, for example, D* algorithm is provided which is disclosed in "The Focussed D Algorithm for Real-Time Replanning (Anthony Stentz, Proceedings of the International Joint Conference on Artificial Intelligence, 1652-1659, 1995)".

In detail, the D* algorithm is known as a global trajectory planning method that is widely used until now where the conventional problem of calculating in real time is solved.

As described above, conventionally, in order to minimize problem due to a distance and time, much research has been done on the trajectory planning algorithm. A minimum distance and cost thereof have been derived through the above research, but there has been no consideration of chance to collide with other moving objects or obstacles while moving on a planned trajectory.

In other words, in the conventional trajectory planning method described above, a trajectory is planned by taking into account a minimum distance and time, but not safety problems of generating a trajectory for avoiding collision prevention according to whether or not obstacles are present. Realistically, optimum trajectory planning has not been yet achieved.

In other words, the field of vision of a robot is limited due to a local enclosed environment. For a case of an actual street other than a trajectory provided in advance, by the above problems due to limitation in visions, autonomous driving of the mobile robot may impossible, as well as, collision is inevitable. Accordingly, by using the above-described conventional methods, optimum autonomous driving cannot be achieved.

Accordingly, in order to solve the above-described problems in conventional trajectory planning, in addition to a trajectory for a minimum distance and a minimum time, it is preferable to provide a new trajectory planning algorithm for a mobile robot which enables safe autonomous driving of the mobile robot by determining whether or not obstacles are present when moving, and prevents collision by establishing a plan for avoiding the same. However, devices and methods that satisfy all of the above requirements have not yet been provided.

Korean Patent No. 10-1664575 discloses a system and method of avoiding an obstacle in a mobile robot.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention is intended to provide a an obstacle avoiding method in a state-time space, a recording medium storing a program for employing the same, and a computer program stored in a medium for employing the same, wherein a forward trajectory is calculated on the basis of a safe timed configuration region, when collision is expected while calculating the forward trajectory, a part of the calculated forward trajectory is canceled, and a forward trajectory passing through an interim target is calculated, and thus a time required for calculating a trajectory and success rate to the destination target state are ensured so as to obtain improvement in performance.

Technical tasks obtainable from the present invention are non-limited the above-mentioned technical task, and other unmentioned technical tasks can be clearly understood from the following description by those having ordinary skill in the technical field to which the present invention pertains.

In order to achieve the above object, according to one aspect of the present invention, there is provided an obstacle avoiding method in a state-time space, wherein the method is employed in a program form executed by an arithmetic processing means including a computer, the method including: calculating a forward trajectory in a state-time space from a current location of a robot or a last calculation point of a previous forward trajectory to a current target waypoint by taking into account a state value s and a time value (time index n), wherein a state value $s_n$ in a state-time space, which is used when calculating the forward trajectory, includes a configuration value of a location and a bearing, and includes any one or a plurality of pieces of information selected from a steering angle, a velocity, and acceleration, the forward trajectory is calculated on the basis of a safe timed configuration region $Q_n^{safe}$ (m) that is a safe space within a configuration region where collisions with static obstacles and dynamic obstacles are not present, when the safe timed configuration region $Q_n^{safe}$ (m) is not present so that collision is inevitable, it is determined that an inevitable collision state occurs, and when the inevitable collision state occurs, a part of the forward trajectory is canceled, and a forward trajectory passing through an interim target is calculated so as to avoid collision.

In addition, the forward trajectory may be calculated by: S20 of setting a waypoint in which a state value ($g_w$) of a robot is calculated when the robot arrives the current target waypoint; S50 of calculating the forward trajectory; and S60 of generating a command for controlling the robot when the S50 of calculating of the forward trajectory is repeated a predetermined number of times.

In addition, in the S20 of setting of the waypoint, the state value gw in the current target waypoint may be set as the equation below so as to minimize a cost-to-go, $$[g_w\ \tilde{g}_{w+1}] = \underset{[g\ \tilde{g}]\in G_w\times G_{w+1}}{\mathrm{argmin}}\ (H(s_f, g) + H(g, \tilde{g}))$$

wherein, $g_w$ represents a state value in the current target waypoint, $\tilde{g}_{w+1}$ represents a state value in a subsequent target waypoint while setting $g_w$, $G_w$ represents a state range of the current target waypoint, $G_{w+1}$ represents a state range of the subsequent target waypoint, H(a,b) represents a cost-to-go function from a to b, $S_f$ represents the current location of the robot, g represents the current target waypoint, and $\tilde{g}$ represents the subsequent target waypoint.

In addition, in the S20 of setting of the waypoint, a time parameter of the forward trajectory may be initialized to a predetermined value when calculating an initial trajectory, and when calculating a trajectory after the initial trajectory, and an inevitable collision state occurs as a configuration value $q_n$ of the robot at a time index (n) is not included in the safe timed configuration region $Q_n^{safe}$ (m), the time parameter of the forward trajectory is set by calculating the same to a greatest value capable of avoiding collision.

In addition, the S50 of calculating of the forward trajectory may include: S51 of incrementally calculating (one step) the forward trajectory when the safe timed configuration region $Q_n^{safe}$ is present; and when the inevitable collision state occurs, S52 of modifying a trajectory in partial, in which the forward trajectory is canceled from a last calculation point of the forward trajectory to a point at which the safe timed configuration region $Q_n^{safe}$ (m) is present, and an interim target is set within the safe timed configuration region $Q_n^{safe}$ (m) on the basis of the last calculation point of the forward trajectory in which the safe timed configuration region $Q_n^{safe}$ (m) is present, and a trajectory passing through the interim target is planned so as to avoid collision.

In addition, in the S52 of modifying the trajectory in partial, a state value of the interim target may be determined as the equation below, $$z_f(-d)=N(s_{f-d},s_{-B},d)$$

wherein, $z_f(-d)$ represents a state value in the interim target, N(a, b, c) represents a near-optimal timed state function calculating a trajectory from a to b during a time step c, $s_{f-d}$ represents a state value of the forward trajectory in which a time step d at which the forward trajectory is canceled is subtracted from a time step f of the forward trajectory at which collision is expected, $s_{-B}$ represents a state value in a step B of a backward trajectory and represents a state value of the current target waypoint when the backward trajectory is not present, and d represents a time step at which the forward trajectory is canceled.

In addition, in the S52 of modifying of the trajectory in partial, a trajectory including the safe timed configuration region $Q_n^{safe}$ (m) may be determined by increasing a time index corresponding to the last calculation point of the forward trajectory in which the safe timed configuration region $Q_n^{safe}$ (m) is present.

In addition, in the S52 of modifying of the trajectory in partial, an identical input value may be calculated for the robot.

In addition, according to an embodiment of the present invention, there is provided a computer-readable recording medium storing a program for employing an obstacle avoiding method in a state-time space.

In addition, according to an embodiment of the present invention, there is provided a program stored in a computer-readable recording medium, wherein the program is for employing an obstacle avoiding method in a state-time space.

According to an obstacle avoiding method in a state-time space, a recording medium storing a program for employing the same, and a computer program stored in a medium for employing the same, a forward trajectory can be calculated on the basis of a safe timed configuration region, when collision is expected while calculating the forward trajectory, a part of the calculated forward trajectory can be canceled, and a forward trajectory passing through an interim target can be calculated, and thus a time required for calculating a trajectory and success rate to the destination target state can be ensured so as to obtain improvement in performance.

In addition, a state value of a robot is set when the robot arrives a target waypoint, and then a forward trajectory is calculated, and thus a trajectory that smoothly passes through a waypoint can be planned.

In addition, a state value of a robot is set when the robot arrives a target waypoint by taking into account of a subsequent target waypoint, and thus a trajectory that smoothly passes through a waypoint can be planned.

In addition, a time parameter of a forward trajectory is initialized by taking into account of an inevitable collision state, an amount of calculation required for trajectory calculation can be reduced.

In addition, by incrementally calculating a forward trajectory and modifying a trajectory in partial, a safe forward trajectory can be calculated in real time by passing through an interim target so as to avoid collision with obstacles.

In addition, by calculating a state value of an interim target when modifying the partial trajectory by using a near-optimal timed state function N, a forward trajectory capable of avoiding obstacles can be generated fast.

In addition, by calculating an identical input value for the robot when modifying the partial trajectory, an amount of calculation required for the trajectory calculation can be reduced.

In addition, according to an obstacle avoiding method in a state-time space, a recording medium storing a program for employing the same, and a computer program stored in a medium for employing the same, better performance for a success rate to get to the destination even when moving obstacles are present, and for an execution time can be ensured.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
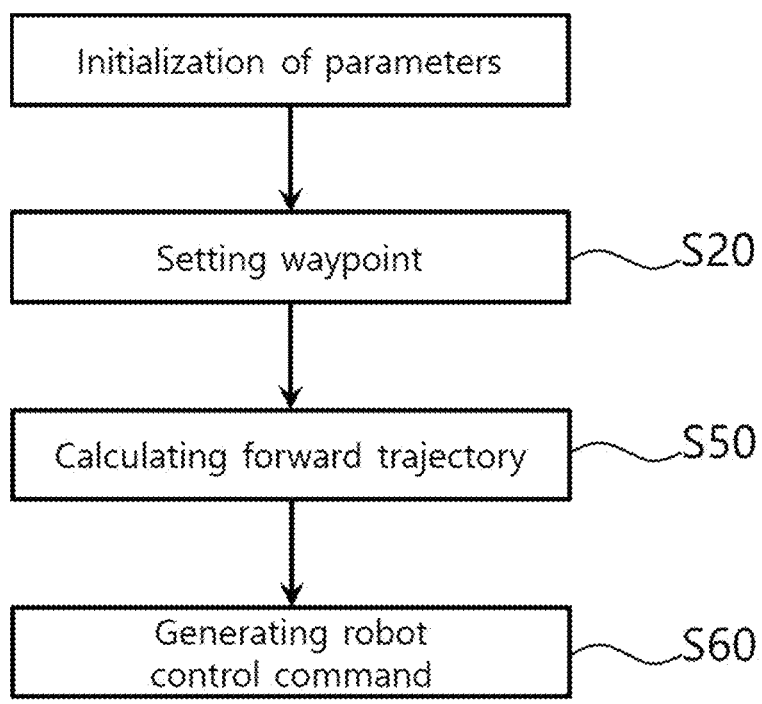
FIG. 1 is a view of a flowchart showing an embodiment of a method of avoiding an obstacle in a state-time space according to the present invention.

The present invention can be modified in various manners and have various forms. Therefore, specific embodiments will be described in detail with reference to the accompanying drawings. However, the present invention is not limited to the specific embodiments, but may include all modifications, equivalents and substitutions within the scope of the present invention.

It will be understood that when an element is referred to as being "connected" or "coupled" to another element, it can be directly connected or coupled to the other element or intervening elements may be present.

In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Herein, with reference to the accompanying drawings, embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. In addition, technical terms and scientific terms used in the present specification have the general meaning understood by those skilled in the art to which the present invention pertains unless otherwise defined, and a description for the known function and configuration obscuring the present invention will be omitted in the following description and the accompanying drawings. The drawings to be provided below are provided by way of example so that the idea of the present invention can be sufficiently delivered to a person skilled in the art to which the present invention pertains. Therefore, the present invention is not limited to the drawings provided below but may be modified in many different forms. In addition, like reference numerals designate like elements throughout the specification. In the drawings, same reference numerals denote same components throughout the disclosure.

Figure 2:
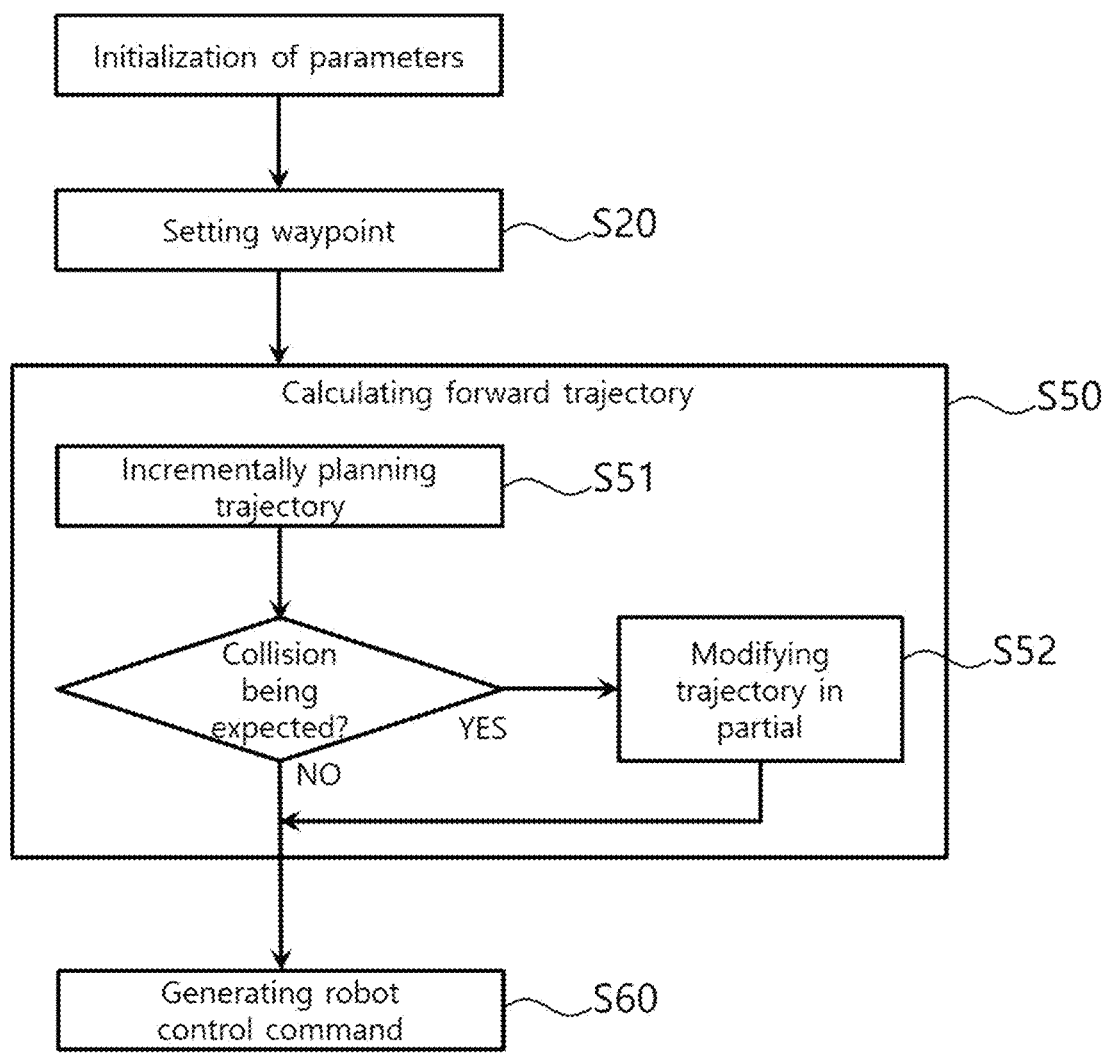
FIG. 2 is a view of a flowchart showing another embodiment of a method of avoiding an obstacle in a state-time space according to the present invention.
Figure 3:
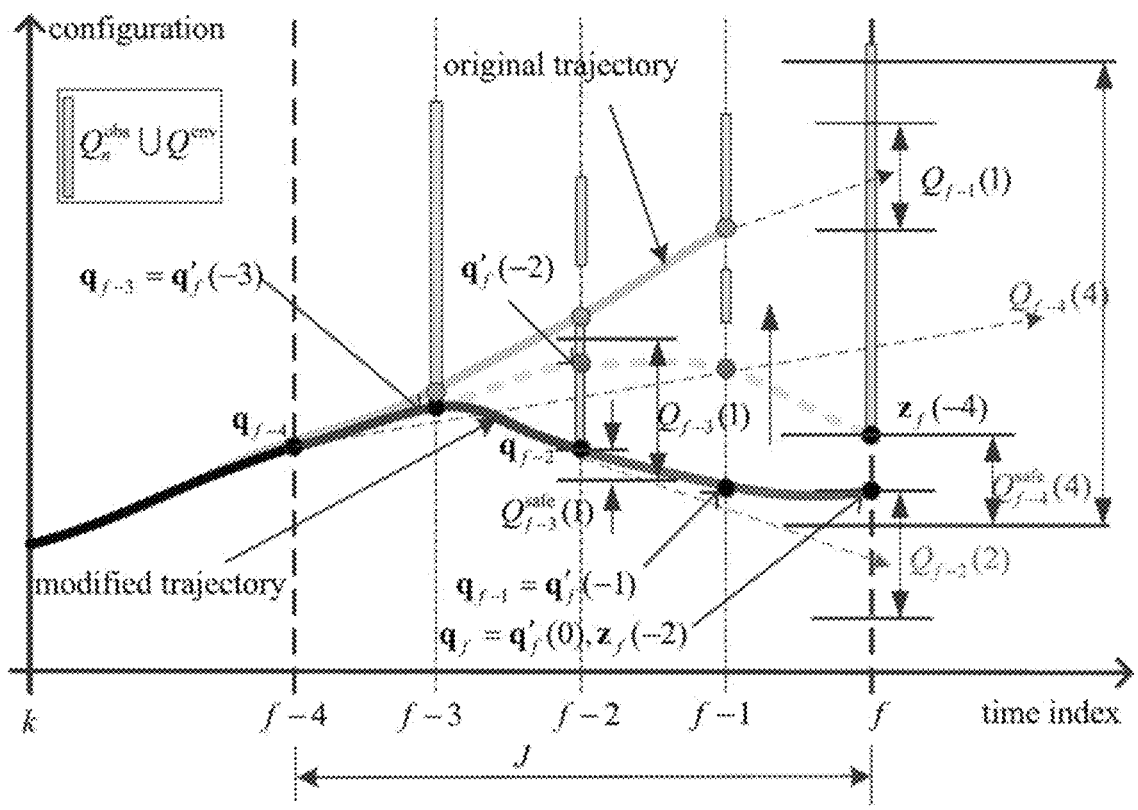
FIG. 3 is a view showing an example of modifying a trajectory in partial.

FIG. 1 is a view of a flowchart showing an embodiment of a method of avoiding an obstacle in a state-time space according to the present invention, FIG. 2 is a view of a flowchart showing another embodiment of a method of avoiding an obstacle in a state-time space according to the present invention, and FIG. 3 is a view showing an example of modifying a trajectory in partial.

Prior to the description, terms used in the present specification (and claims) will be briefly described.

A "state-time space" refers to a set of state values taking into account of time.

A "state value" refers to a value including a configuration including a location and a bearing (heading angle), and includes any one or a plurality of pieces of information selected from a steering angle, a velocity (linear velocity, angular velocity), and an acceleration. For example, the same may be (x coordinate, y coordinate, bearing, velocity, acceleration), etc.

A "timed configuration region" means a set of configuration values taking into account time.

A "configuration value" refers to a value including a location and a bearing (heading angle). For example, the same may be (x coordinate, y coordinate, bearing), etc.

A "waypoint" refers to a designated location trough which a robot passes when calculating a driving trajectory.

For the description, various parameters and terms are designated and described. The variables and terms are as below.

A state value of a current location of the robot is represented as "$s_k$".

A state value at an f step calculated in a forward trajectory from a current location of the robot is represented as "$s_f$".

A state value of the robot when the robot arrives at a current target waypoint is represented as "$g_w$".

A state value calculated for a b step in a backward trajectory from the current target waypoint is represented as "$s_{-b}$".

A time index representing to which step corresponds the calculation is represented as "n".

A time interval given for calculating one step is represented as "T".

A time at a time index n is represented as "t" (t=nT).

A state value of the robot is represented as "s" (lowercase s).

A state space that is a set of state values of the robot is represented as "S" (capital letter S).

A timed state value that is a state value at a time step n is represented as $s_n$ (lowercase s).

A state-time space is represented as "$S_n$" ($s_n \in S_n$).

A configuration value of the robot is represented as "q" (lowercase q).

A configuration region that is a set of configuration values of the robot is represented as "Q" (capital letter Q).

A timed configuration value that is a configuration value at a time step n is represented as $q_n$ (lowercase q).

A timed configuration region is represented as "$Q_n$" ($q_n \in Q_n$).

A configuration region where collision with static obstacles is present is represented as $Q^{env}$.

A free static configuration region where collision with static obstacles is not present is represented as $Q^{free}$ ($Q^{free}=Q-Q^{env}$).

A configuration region where collision with dynamic obstacle is present at a time index n is represented as $Q_n^{obs}$.

A free dynamic configuration region where collision with static obstacles and dynamic obstacles is not present is represented as $Q_n^{free}$ ($Q_n^{free}=Q^{free}-Q_n^{obs}$).

A state where collision is inevitable is referred to an "inevitable state".

Fundamental parameters and terms are summarized, but not all of the parameters and terms necessary for the description are listed. Parameters and terms that are used in addition to the parameters and terms defined above will be described later.

Hereinafter, in the description, description will be made assuming that the robot moves from a current state point corresponding to a state value $s_k$ to a target point (current target waypoint) corresponding to a state value $g_w$.

In an obstacle avoiding method in a state-time space according to an embodiment of the present invention, for an obstacle avoiding method in a state-time space, wherein the method is employed in a program form executed by an arithmetic processing means including a computer, a forward trajectory in a state-time space taking into account a state value s and a time value (time index n) is calculated from a current location of a robot or a last calculation point of a forward trajectory to a current target waypoint.

Herein, a state value $s_n$ in a state-time space used for calculating the forward trajectory includes a configuration value of a location and a bearing (heading angle), and includes any one or a plurality of pieces of information selected from a steering angle, a velocity (linear velocity, angular velocity), and acceleration.

The forward trajectory is calculated on the basis of a safe timed configuration region $Q_n^{safe}$ (m) that is a safe space in a configuration region where collisions with static obstacles and dynamic obstacles are not present. When the safe timed configuration region $Q_n^{safe}$ (m) is not present so that collision is inevitable, it is determined that an inevitable collision state (ICS) occurs.

When the inevitable collision state occurs, a part of the planned forward trajectory is canceled, and a forward trajectory passing an interim target is planned so as to avoid the collision.

Herein, the time value is a value through which a future time from the current time is confirmed. For the same, a time index n may be used, but various methods may be used when an actual progress time can be confirmed such as multiplying a calculation period that calculates one step with a time index n (calculation period*time index n), etc.

In the forward trajectory calculation, a forward trajectory in a state-time space is calculated from an initial current location of the robot to a current target waypoint. Subsequently, a subsequent forward trajectory in a state-time space may be calculated from a last calculation point of the forward trajectory to the target waypoint.

In other words, in a an obstacle avoiding method in a state-time space according to an embodiment of the present invention, a forward trajectory is sequentially calculated, and when an inevitable collision state occurs while planning the forward trajectory, a part of the forward trajectory that is planned (calculated) in the meantime is canceled, an interim target capable of avoiding the inevitable collision state is set, and then a forward trajectory passing through the interim target is re-planned so as to avoid the collision.

Herein, whether or not the inevitable collision state (ICS) occurs may be determined by whether or not a safe timed configuration region $Q_n^{safe}$ (m) is present.

In an obstacle avoiding method in a state-time space according to the present invention, in forward trajectory calculation, a cost-to-go function H is decomposited, and a priority r (r is a natural number) is assigned to the decomposited cost-to-go function $H^r$.

The decomposited cost-to-go functions $H^r$ are applied to a near-optimal timed state function N according to a preset reference which calculates a trajectory where a value of summing the decomposited cost-to-go function $H^r$ becomes minimum (an $r^*$ value may be set or calculated).

Herein, a state value $s_{n+m}$ in a step where the number m of steps to be calculated is progressed from the given point of the state value $s_n$ toward the target point $s^{to}$ is calculated on the basis of a given state value $s_n$ in an n (n is natural number) step, a state value $s^{to}$ at a target point, and a number m of steps to be calculated.

Herein, a weighting factor is assigned to each decomposited cost function $H^r$, and a near-optimal timed state function N may be applied thereto so that a trajectory is calculated where the sum of values obtained by respectively multiplying the weight and decomposited cost functions $H^r$ becomes minimum.

Alternatively, in forward trajectory calculation and backward calculation, a cost-to-go function H is decomposited, and a priority r (r is a natural number)) is assigned to the decomposited cost-to-go function $H^r$.

The decomposited cost-to-go functions $H^r$ are sequentially applied to a near-optimal timed state function N according to the priority (an $r^*$ value may be set or calculated) which calculates a trajectory where each value of the decomposited cost functions $H^r$ becomes minimum.

Herein, a state value $s_{n+m}$ in a step where the number m of steps to be calculated is progressed from the given point of the state value $s_n$ toward the target point $s^{to}$ is calculated on the basis of a state value $s_n$ given in an n step, a state value $s^{to}$ at a target point and a number m of steps to be calculated.

When planning the state value $s_{n+m}$ including the given state value sn, a cost-to-go from the state value $s_{n+m}$ to a point corresponding to the target state value $s^{to}$ is calculated to be minimum.

In other words, the forward trajectory calculation may be defined as below.

$$s_{n+m} = \operatorname*{argmin}_{s \in S_n^{safe}(n)} H(s, s^{to})$$

Herein, $s_{n+m}$ is a state value at a time n+m, H is a cost-to-go function, s is a given state value, $s^{to}$ is a state value at a target point, and m is a number of steps to be calculated.

When a cost-to-go function (H) is used, long time is required for calculation, and thus applying in real time to trajectory calculation is difficult.

An input value $u_n$ for the robot may be obtained as below.

$$u_n = \operatorname*{argmin}_{u \in U_n(m)} H_{Input}(s_n, s_{n+m})$$

$$\overline{U}_n(m) = \left\{ u \in U \mid s_{n+m} = g(s_n, u, m) \right.$$

$$\left. s_{n+m} = \operatorname*{argmin}_{s \in S_n^{safe}(m)} H(s, s^{to}) \right\}$$

Herein, $H_{input}$ is a given cost cost-to-go function about input for the least effort.

The available input is always present since planning is performed for a $s_{n+m}$ within a safe space that is bounded by the available input space of the available robot.

When the cost-to-go function for minimizing the cost-to-go is too complex to calculate a trajectory in real time, a function decomposition-based optimization method may be used.

A function decomposition-based optimization method decomposes a function into simple parts, and minimizes a dominant part first. It is assumed that H is configured with R parts as below.

$$H = \sum_{r=1,2,\ldots,R} H^r$$

Herein $H^r$'s are arranged in order of dominance. In other words, $H^r$ with smaller r is more dominant. When minimizing is performed sequentially one by one from $H^1$ to $H^R$, an available safe space becomes smaller. The decomposited cost-to-go function ($H^r$) is minimized by increasing the r value unit a single state value is induced.

A safe timed state space $\hat{S}_n^r(m)$ that minimizes r parts from $H^1$ to $H^r$ may be defined as below.

$$\hat{S}_n^{r^*}(m) = \left\{ s \mid \operatorname*{argmin}_{s \in \hat{S}_n^{r-1}(m)} (H^r(s, s^{to})) \right\}$$

A safe timed state space $\hat{S}_n^0(m)$ calculated by using a cost-to-go function that is not decomposited is identical to a safe timed state space $S_n^{safe}(m)$.

An r value from which one state value is induced is referred to as $r^*$, and minimizing is performed for the decomposited cost-to-go function until $r^*$ is obtained. Herein, a usable safe timed state space is reduced to a single state as below.

$$\{s_{n+m}\} = \hat{S}_n^{r^*}(m)$$

Herein, $$r^* = \min\{r \in \{1, 2, \ldots, R\} \mid |\hat{S}_n^r(m)| = 1\}$$

Even though the timed state value obtained from function decomposition-based minimization does not minimize H, the result is close to minimum as dominant parts are minimized.

In addition, real time execution is available, and calculation is efficient.

Accordingly, when a near-optimal timed state function N is applied, the forward trajectory calculation may be performed as below.

$$s_{n+m} = N(s_n, s^{to}, m)$$

Herein, $s_{n+m}$ is a state value in an n+m step, N is a near-optimal timed state value calculation function, $s_n$ is a given state value in an n step, and $s^{to}$ is a state value at a target point, and m is a number of steps to be calculated.

In case of an omnidirectional movable robot, for example, the near-optimal timed state function N may be calculated by using the equation below.

$$H(s^{from}, s^{to}) = H^1 + H^2 + H^3$$

$$H^1 = \|p^{from} - p^{to}\|$$

$$H^2 = |\phi^{from} - \varphi| + |\phi^{to} - \varphi|$$

-continued $$H^3 = \left| \frac{v^{from}D}{v_{max}\min(D, \|p^{from}\| - p^{to}\|)} - \frac{\pi - |\phi^{from} - \varphi|}{\pi} \right| +$$

$$\left| \frac{v^{to}D}{v_{max}\min(D, \|p^{from} - p^{to}\|)} - \frac{\pi - |\phi^{to} - \varphi|}{\pi} \right|$$

Herein, $H^1$ is a velocity-independent cost-to-go function, $H^2$ is a moving direction part cost-to-go function, and $H^3$ is a velocity magnitude part cost-to-go function.

In order to induce the robot to move toward the target fast and pass through waypoints effectively, a cost-to-go function $H(s^{from}, s^{to})$ may be configured with three parts, and D is a predefined threshold distance.

Each location in a reachable region is matched 1:1 with an admissible velocity space, and thus each timed state is determined on the basis of the velocity-independent cost-to-go function $H^1$.

The moving direction part cost-to-go function $H^2$ and the velocity magnitude part cost-to-go function $H^3$ are used for setting a state of a current target waypoint.

On the basis of $H^1$, each timed configuration is determined to be the closest one to the target.

$H^2$ and $H^3$ are designed for setting a state of the current target waypoint.

A velocity at the current target waypoint is determined by taking account into a robot location, a location of a target waypoint, and a location of a subsequent waypoint.

A direction is determined as an average direction of two vectors which are from a robot location to a location of a target waypoint, and from a location of a waypoint to a location of a subsequent waypoint.

In addition, a magnitude of a velocity at a target waypoint is determined according to an interior angle of a trajectory at the target waypoint.

When the angle is large, the velocity becomes fast, or vice versa.

When an Euclidean distance between a robot location and a location of a target waypoint or between a location of the target waypoint and a location of a subsequent waypoint is smaller than D, a magnitude of a velocity of the current target waypoint is set proportional to the distance in order to not oscillate near the waypoint.

In case of a robot moving through wheels, for example, the near-optimal timed state function N may be calculated by using the equation below.

$$H(s^{from}, s^{to}) = H^1 + H^2 + H^3$$

$$H^1 = \alpha(\|p^{from} - p^{to}\|) + (1 - \alpha)(|\theta^{from} - \varphi| + |\theta^{to} - \varphi|)$$

$$H^2 = \left| \frac{v^{from}D}{v_{max}\min(D, \|q^{from} - q^{to}\|)} - \frac{\pi - |\theta^{from} - \varphi|}{\pi} \right| +$$

$$\left| \frac{v^{to}D}{v_{max}\min(D, \|q^{from} - q^{to}\|)} - \frac{\pi - |\theta^{to} - \varphi|}{\pi} \right|$$

$$H^3 = \left| \frac{\omega^{from}}{\omega_{max}} - \frac{\varphi - \theta^{from}}{\pi} \right|$$

Herein, $H^1$ is a velocity-independent cost-to-go function, $H^2$ is a moving direction pat cost-to-go function, and $H^3$ is a velocity magnitude part cost-to-go function.

As the example of the omnidirectional movable robot, each timed state is determined on the basis of the velocity-independent cost-to-go function $H^1$.

In order to take into account both of a location close to a target location and a direction to the target location, $H^1$ is configured with two parts with a predefined weighting factor $\alpha$.

The moving direction pat cost-to-go function $H^2$ and the velocity magnitude part cost-to-go function $H^3$ are used for setting a linear and angular velocity of a current target waypoint similar to the case of the omnidirectional movable robot.

In an obstacle avoiding method in a state-time space according to an embodiment of the present invention, in forward trajectory calculation, when a safe timed configuration region $Q_n^{safe}$ (m) that is a safe space within a configuration region where collisions with static obstacles and dynamic obstacles are not present is present, a forward trajectory is calculated on the basis of a configuration value $q_n$ of the robot at a time index n, and the safe timed configuration region $Q_n^{safe}$ (m) at a time index n.

When a set of configuration values where collision with static environmental obstacles such as wall is present is referred to as $Q^{env}$ and as "environmental obstacle configuration region" ($Q^{env} \subset Q$), difference of sets obtained by subtracting the environmental obstacle configuration region $Q^{env}$ from the configuration region Q may be referred to as a "free static configuration region" $Q^{free}$.

The robot may predict a trajectory of each dynamic obstacle such as people and other robots on the basis of a tracking algorithm using sensor data.

Accordingly, when a set of configuration values predicted to collide with any dynamic obstacles such as people at a time index n is referred to as $Q_n^{obs}$ and as a dynamic obstacle space "($Q_n^{obs} \subset Q$), difference of sets obtained by subtracting the dynamic obstacle space $Q_n^{obs}$ from the free static configuration region $Q^{free}$ may be referred to as a "free dynamic configuration region" $Q_n^{free}$.

In other words, the free dynamic configuration region $Q_n^{free}$ at a time index n may be a safe space where the robot does not collide with obstacles including dynamic obstacles and static obstacles at a time index n.

A motion of a robot system with an input value $u_n$ ($u_n \in U$) in an input space U of the robot at a time index n may be defined as below.

$$s_{n+1} = f(s_n, u_n)$$

Herein, f is a motion model function of a robot.

A state space S of the robot and an input space U of the robot are bounded, and thus robot motion is constrained which is referred to a motion constraint.

Environment detectors (sensors) detect and track obstacles on the basis of a sensory system using sensors, such as vision sensors or laser range finders (LRF), etc., and classify the same into static obstacles (environmental obstacles) and dynamic obstacles (non-environmental obstacles) to obtain $Q^{env}$ and $Q_n^{obs}$.

Global trajectory planner (global path planner) planning a trajectory by assigning a waypoint plans a sequence of waypoints and a target inside a free static configuration region $Q^{free}$.

At every time instant t=kT, k=0, 1, . . . , an algorithm plans a trajectory by using a reference input k.

By the above input, the robot passes through waypoints sequentially and arrive the target without any collision by using both of $Q^{env}$ and $Q_n^{obs}$.

When a timed state value $s_n$ is given, a reachable state-time region at a time index n+m may be defined. Herein, a reachable timed configuration region may be also defined.

In order to plan a trajectory in real time, it is preferable to reduce an amount of calculation by approximating the reachable state-time region or timed configuration region.

It may be difficult to perform real time calculation when the reachable state-time region or timed configuration region is calculated accurately and used.

In order to simplify the reachable region, the robot may be controlled for m time steps by using a uniform robot input value.

A reachable state-time region that is reachable by the uniform robot input value may be defined as below.

$$S_n(m) = \{s_{n+m} \in S | \forall u_n \in U, s_{n+m} = g(s_n, u_n, m)\}$$

Herein, g is an approximated motion model function of a robot.

Herein, a reachable timed configuration region that is reachable by the uniform robot input value may be defined as below.

$$Q_n(m) = \{q_{n+m} \in Q \mid \forall u_n \in U, s_{n+m} = g(s_n, u_n, m), s_{n+m} \in S\}$$

$S_n(m)$ and $Q_n(m)$ do not cover the whole actual reachable region, but calculation load is very small rather than calculating the whole actual reachable region, and thus the same are useful for trajectory planning.

When a state value $s_n$ is given, a safe timed state space $S_n^{safe}(m)$ at a time index n+m may be defined as below.

$$S_n^{safe}(m) = S_n(m) \cap S_{n+m}^{free}, (n > 0, m > 0)$$

In addition, when a state value $s_n$ is given, a safe timed configuration region $Q_n^{safe}(m)$ at a time n+m may be defined as below.

$$Q_n^{safe}(m) = Q_n(m) \cap Q_{n+m}^{free}, (n > 0, m > 0)$$

$Q_n^{safe}(m)$ is planned within $S_n^{safe}(m)$, but using $Q_n^{safe}(m)$ may be enough by checking predicted collision and by check whether or not an available safe space is present.

When calculating the safe timed configuration region $Q_n^{safe}(m)$ of a backward trajectory at a current target waypoint, $Q_{n+m}^{free}$ is replaced with $Q^{free}$.

This is because, an actual time of $Q_{n+m}^{free}$ is not given, and thus data of dynamic obstacles is not obtained.

An obstacle avoiding method in a state-time space according to an embodiment of the present invention may include S20 of setting a waypoint, S50 of calculating a forward trajectory, and S60 of generating a robot control command.

The S20 of setting a waypoint is setting a state value $g_w$ of the robot when the robot arrives a current target waypoint.

The current target waypoint is a waypoint where a forward trajectory is heading to pass through.

The S20 of setting a waypoint is setting a robot state when the robot passes the current target waypoint. It is preferable to set the robot state when the robot passes the current target waypoint by taking into account of a robot location, a location of a target waypoint, and a location of a subsequent waypoint.

The S50 of calculating a forward trajectory calculates a forward trajectory.

In the S50 of calculating a forward trajectory, a forward trajectory is sequentially planned from a current location of the robot to a target waypoint.

The forward trajectory may be calculated by using the equation below, $$s_{n+m} = \underset{s \in S_n^{safe}(n)}{\operatorname{argmin}} H(s, s^{to})$$

or by using the equation below, $$s_{n+m} = N(s_n, s^{to}, m).$$

The S60 of generating a robot control command generates a command for controlling the robot according to the forward trajectory when the S50 of calculating a forward trajectory is repeated a predetermined number of times.

An input value for the robot generated in the S60 of generating a robot control command may be calculated as below.

$$u_k = \underset{u \in U_k(1)}{\operatorname{argmin}} H_{Input}(s_k, s_{k+1})$$

Herein, $u_k$ is an input value for a robot at a time k, $u \in U_k(1)$ is an input value for the robot which is included in an input space of the robot at a k-th step where one step may be run, $H_{input}$ is a minimum cost-to-go function for an input value for the robot, $S_k$ is a state value of the robot at a time k, and $s_{k+1}$ is a state value of the robot at a time k+1.

In an obstacle avoiding method in a state-time space according to the present invention, the S20 of setting a waypoint is setting a state value $g_w$ of a current target waypoint so as to minimize a cost-to-go, and is set as the equation below.

$$[g_w \; \tilde{g}_{w+1}] = \underset{[g \; \tilde{g}] \in G_w \times G_{w+1}}{\operatorname{argmin}} (H(s_f, g) + H(g, \tilde{g}))$$

Herein, $g_w$ represents a state value of a current target waypoint, $\tilde{g}_{w+1}$ represents a state value of a subsequent target waypoint while setting $g_w$, $G_w$ represents a state range of the current target waypoint, $G_{w+1}$ represents a state range of the subsequent target waypoint, H(a,b) represents a cost-to-go function from a to b, $S_f$ represents a current location of a robot, g represents the current target waypoint, and $\tilde{g}$ represents a subsequent waypoint of the current target waypoint.

In an obstacle avoiding method in a state-time space according to an embodiment of the present invention, in the S20 of setting a waypoint, when calculating an initial trajectory, a time parameter of a forward trajectory is initialized to a preset value. Subsequently, when calculating a trajectory after a final trajectory, and an inevitable collision state occurs as a configuration value $q_n$ of the robot at a time index n is not included in a safe timed configuration region $Q_n^{safe}(m)$, a time parameter of the forward trajectory is set by calculating the same to a greatest value capable of avoiding the collision.

It is preferable to operate the robot when the forward trajectory is calculated for a predetermined number of steps.

Calculating the entire forward trajectory causes increase in an amount of calculation when an inevitable collision state occurs due to unpredictable situation of dynamic obstacles so that trajectory modification is required.

Accordingly, it is preferable to operate the robot when a forward trajectory is calculated for one set that is a preset number of steps of the forward trajectory.

Subsequently, when collision is not expected in a subsequent set of forward trajectory calculation, calculating again the calculated the forward trajectory in the meantime may be performing unnecessary calculation.

Accordingly, when calculating a trajectory after the initial trajectory calculation and an inevitable collision state does not occur, it is preferable to calculate a forward trajectory for a section that does not overlap among a predetermined number of steps of a subsequent forward trajectory when calculating a subsequent set of the subsequent forward trajectory.

In addition, when calculating a trajectory after the initial trajectory calculation and an inevitable collision state occurs, it is preferable to calculate the entire set that is a predetermined number of steps of the forward trajectory by calculating a time parameter of the forward trajectory to be greater enough to avoid collision.

In an obstacle avoiding method in a state-time space according to an embodiment of the present invention, the S50 of calculating a forward trajectory includes S51 of incrementally planning a trajectory, and S52 of modifying a trajectory in partial.

In S51 of incrementally planning a trajectory, a forward trajectory is calculated when a safe timed configuration region $Q_n^{safe}(m)$ is present.

When an available safe timed configuration region $Q_n^{safe}(m)$ is present, a state where each time is designated is planned within the safe timed configuration region $Q_n^{safe}(m)$.

In order to derive the robot to move toward $s_{-B}$ without collision, a timed state value $s_f$ may be calculated for one step toward $s_{-B}$ within the safe timed configuration region $Q_n^{safe}(m)$ by using the equation below.

$$s_f = N(s_{f-1}, s_{-B}, 1)$$

When the safe timed configuration region $Q_n^{safe}(m)$ is not present $Q_{f-1}^{safe}(1)=\emptyset$, a timed state without collision is not obtained by using the above equation, and thus a part of the forward trajectory has to be modified.

When the safe timed configuration region $Q_n^{safe}(m)$ is not present $Q_{f-1}^{safe}(1)=\emptyset$, a part of the planned forward trajectory is modified through S52 of modifying a trajectory in partial which will be described later.

In S52 of modifying a trajectory in partial, the planned forward trajectory is canceled from a last calculation point of the forward trajectory to a point at which the safe timed configuration region $Q_n^{safe}(m)$ is present when an inevitable collision state occurs, and an interim target is set within the safe timed configuration region $Q_n^{safe}(m)$ on the basis of the last calculation point of the forward trajectory in which the safe timed configuration region $Q_n^{safe}(m)$ is present, and then a trajectory passing through the interim target is planned so as to avoid collision.

First, a number of time steps, $P_{min}$, required for modification is calculated by using the equation below.

$$P_{min} = \min\{p \in \{2, 3, \ldots, f-k\} | Q_{f-p}^{safe}(p) \neq \emptyset\}$$

When an available safe timed configuration region $Q_{f-p}^{safe}(p)$ is present, the robot may move by a uniform input without collision at a time index f during $[(f-p)T, fT]$.

$s_f - P_{min}$ is a state space where an inevitable collision state is expected not to occur.

$P_{min}$ may be obtained by following the precedent planned forward trajectory in backwards.

Setting the time parameter of the forward trajectory to the greatest value (f-p) capable of avoiding collision is to minimize a trajectory that is canceled from the calculated trajectory.

It is possible to check an inevitable collision state for each time step, but it may be determined that an inevitable collision state occurs when a safe timed configuration region $Q_n^{safe}(m)$ is not present.

Herein, a part of the calculated forward trajectory is modified in advance so that an inevitable collision state does not occur in the forward trajectory so as to avoid collision.

Taking into account that a point at which the robot collides with each obstacle has to be calculated in real time, the robot takes more flexible and appropriate actions even when many obstacles are present.

Herein, within the safe timed configuration region $Q_n^{safe}(m)$, a state value closest to the current target waypoint may be set to an interim target.

This is because, even though a forward trajectory capable of avoiding a target object is replanned, an optimum forward trajectory capable of avoiding a target object is replanned by minimizing the difference with the initial planned forward trajectory.

In an obstacle avoiding method in a state-time space according to an embodiment of the present invention, in the S52 of modifying a trajectory in partial, a state value of the interim target is determined as the equation below.

$$z_f(-d) = N(s_{f-d}, s_{-B}, d)$$

Herein, $z_f(-d)$ represents a state value of an interim target, N(a, b, c) represents a near-optimal timed state function calculating a trajectory from a to b during a time step c, $s_{f-d}$ represents a state value of a forward trajectory where a time step d at which the forward trajectory is canceled is subtracted from a time step f of the forward trajectory at which collision is expected, $s_{-B}$ represents a state value at a step B of a backward trajectory and represents a state value of the current target waypoint when the backward trajectory is not present, and d represents a time step at which the forward trajectory is canceled.

In an obstacle avoiding method in a state-time space according to an embodiment of the present invention, in the S52 of modifying a trajectory in partial, a trajectory where a safe timed configuration region $Q_n^{safe}(m)$ is present is planned by increasing a time index from a time index corresponding to a last calculation point of the forward trajectory where a safe timed configuration region $Q_n^{safe}(m)$ is present.

The modified part of the trajectory is at least $P_{min}$ and at most (f-k) that is a time interval where a time step k at which the robot is currently present is subtracted from a time step f at which the maximum forward trajectory is calculated.

A trajectory where collision is not present is determined by increasing a number J of time steps to be modified from $P_{min}$ to f-k until the time index becomes f.

When the trajectory where collision is not present is not determined until J becomes f-k, the robot is expected to collide with an obstacle.

Calculation is performed by using the forward trajectory $s_{f-d+1}$, d=J, J-1, ..., 1, the interim target $z_f(-d)$, and an interim timed state $s_f'(-d+1)$.

An index (subscript) d is a number of time intervals from f in a reverse direction.

In an obstacle avoiding method in a state-time space according to an embodiment of the present invention, in the S52 of modifying a trajectory in partial, an identical input value ((constant, uniform) is calculated for the robot.

This is to simplify the calculation.

The interim target $z_f(-d)$ is a temporary target, and is an expected state of the robot moving by using the uniform input at time index f during $[(f-p)T, fT]$.

In order to derive the robot toward $s_{-B}$ safely, $z_f(-d)$ may be calculated as below.

$$z_f(-d)=N(s_{f-d}, s_{-B}, d)$$

After determining the interim target, a temporary timed state $s_f'(-d+1)$ that is a timed state at a time index f−d+1 on a trajectory where the robot moves with a temporary input state $u_f'(-d)$ may be calculated by using the equation below.

$$s_f'(-d+1)=f(s_{f-d}, u_f'(-d))$$

Herein, an input value $u_f'(-d)$ for the robot may be obtained by using the equation below.

$$u_f'(-d) = \underset{u \in U_{f-d}(d)}{\arg\min} H_{Input}(s_{f-d}, z_f(-d))$$

Finally, a timed state $s_{f-d+1}$ that is modified toward $s_f'(-d+1)$ within $S_{f-p}^{safe}(1)$ may be determined as the equation below.

$$s_{f-d+1}=N(s_{f-d}, s_f'(-d+1), 1)$$

When $s_{f-d}=s_f'(-d)$, $u_f'(-d)$ is identical to a previous value, and thus calculation of $z_f(-d)$ is not necessary.

In other words, $z_f(-d)=z_f(-d-1)$ and $u_f'(-d)=u_f'(-d-1)$.

The S52 of modifying a trajectory in partial will be described in detail with reference to FIG. 3.

In FIG. 3, a configuration region is represented in one dimension (vertical axis) in a vertical direction for easy understanding.

In other words, a vertical axis of FIG. 3 represents a configuration region, and a horizontal axis represents a time space.

Before modifying a trajectory, $P_{min}$ is obtained as $4(Q_{f-4}^{safe}(4)=\emptyset)$, and J is set to $P_{min}$.

Subsequently, a modified trajectory $s_{f-d+1}$, d=J, J−1, . . . 1 is obtained.

For modification, first, a midterm target $z_f(-4)$ is set toward $s_{-B}$ within $S_{f-4}^{safe}(4)$.

Subsequently, $s_{f-3}$ is determined as a timed state value $s_f'(-3)$ since there is no disturbing obstacle.

However, $s_{f-2}$ is not determined as $s_f'(-2)$ due to disturbing obstacles, but is determined to a state closest to $s_f'(-2)$ within $S_{f-3}^{safe}(1)$ in which disturbing obstacles are not present.

Subsequently, a midterm target $z_f(-2)$ is set as a trajectory for $z_f(-4)$ is modified during determining $s_{f-2}$.

Subsequently, during d=2, 1, $s_{f-1}$ and sf are determined on the basis of $z_f(-2)$ since disturbing obstacles are not present.

This means that the robot is supposed to pass through $z_f(-2)$ at a time index f at which the robot moves by the uniform input during $[(f-2)T, fT]$.

When planning a state at each time step, modifying a trajectory in partial is performed, and when $P_{min}$ is determined as f−k, (that is, when the entire trajectory is modified) the most calculation occurs.

As above, an obstacle avoiding method in a state-time space according to an embodiment of the present invention has been described. However, a computer-readable recording medium on which a program for employing an obstacle avoiding method in a state-time space, and a program stored on a computer-readable recording medium for employing an obstacle avoiding method in a state-time space may be also feasible.

In other words, those skilled in the art will readily understand that an obstacle avoiding method in a state-time space described above may be provided in a recording medium that can be read by a computer by tangibly embodying in the form of program instructions executable through diverse computing means and may be recorded in computer readable media. In other words, the method may be employed in the form of a program command that can be executed through various computer means, and can be recorded on a computer-readable recording medium. The computer readable media may include independently or associatively program instructions, data files, data structures, and so on. Program instructions recorded in the media may be specially designed and configured for embodiments, or may be generally known by those skilled in the computer software art. Computer readable recording media may include magnetic media such as hard disks and floppy disks, optical media such as CD-ROMs and DVDs, magneto-optical media such as floptical disks, and hardware units, such as ROM, RAM, flash memory, and so on, which are intentionally formed to store and perform program instructions. Program instructions may include high-class language codes executable by computers using interpreters, as well as machine language codes likely made by compilers. The hardware units may be configured to function as one or more software modules for performing operations according to embodiments of the present disclosure, and vice versa.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An obstacle avoiding method in a state-time space, wherein the method is employed in a program form executed by an arithmetic processing means including a computer, the method comprising:

calculating a forward trajectory in a state-time space from a current location of a robot or a last calculation point of a previous forward trajectory to a current target waypoint by taking into account a state value (s) and a time value (time index n), wherein a state value ($s_n$) in a state-time space, which is used when calculating the forward trajectory, includes a configuration value of a location and a bearing, and includes any one or a plurality of pieces of information selected from a steering angle, a velocity, and an acceleration, the forward trajectory is calculated on the basis of a safe timed configuration region $Q_n^{safe}$ (m) that is a safe space within a configuration region where collisions with static obstacles and dynamic obstacles are not present, wherein the obstacle avoiding method is performed:

in response to detection of the safe timed configuration region $Q_n^{safe}$ (m) not being presented so that collision is inevitable, determining it is determined that an inevitable collision state occurs, and in response to detection of the inevitable collision state being occurred, canceling a part of the forward trajectory, and calculating a forward trajectory passing through an interim target so as to avoid the collision.

2. The method of claim 1, wherein the forward trajectory is calculated by:
setting a waypoint in which a state value (gw) of a robot is calculated when the robot arrives at the current target waypoint;
calculating the forward trajectory; and
generating a command for controlling the robot when the calculating the forward trajectory is repeated a predetermined number of times.

3. The method of claim 2, wherein in the setting of the waypoint, the state value (gw) in the current target waypoint is set as the equation below so as to minimize a cost-to-go, $$[g_w \; \tilde{g}_{w+1}] = \underset{[g \; \tilde{g}] \in G_W \times G_{W+1}}{\operatorname{argmin}} \; (H(s_f, g) + H(g, \tilde{g}))$$

wherein, $g_w$ represents a state value in the current target waypoint, $\tilde{g}_{w+1}$ represents a state value in a subsequent target waypoint while setting $g_w$, $G_W$ represents a state range in the current target waypoint, $G_{w+1}$ represents a state range in the subsequent target waypoint, H(a,b) represents a cost-to-go function from a to b, $S_f$ represents the current location of the robot, g represents the current target waypoint, and $\tilde{g}$ represents the subsequent target waypoint.

4. The method of claim 2, wherein in the setting of the waypoint, a time parameter of the forward trajectory is initialized to a predetermined value when calculating an initial trajectory, and
when calculating a trajectory after the initial trajectory, and an inevitable collision state occurs as a configuration value ($q_n$) of the robot at a time index (n) is not included in the safe timed configuration region $Q_n^{safe}$ (m), the time parameter of the forward trajectory is set by calculating the same to a greatest value capable of avoiding collision.

5. The method of claim 2, wherein calculating of the forward trajectory includes:
incrementally calculating (one step) the forward trajectory when the safe timed configuration region $Q_n^{safe}$ (m) is present; and
when the inevitable collision state occurs, modifying a trajectory in partial, in which the forward trajectory is canceled from a last calculation point of the forward trajectory to a point at which the safe timed configuration region $Q_n^{safe}$ (m) is present, and an interim target is set within the safe timed configuration region $Q_n^{safe}$ (m) on the basis of the last calculation point of the forward trajectory in which the safe timed configuration region $Q_n^{safe}$ (m) is present, and a trajectory passing through the interim target is planned so as to avoid collision.

6. The method of claim 5, wherein modifying the trajectory in partial, a state value of the interim target is determined as the equation below, $$z_f(-d) = N(s_{f-d}, s_{-B}, d)$$

wherein, $z_f$(−d) represents a state value in the interim target, N(a, b, c) represents a near-optimal timed state function calculating a trajectory from a to b during a time step c, $s_{f-d}$ represents a state value of the forward trajectory in which a time step d at which the forward trajectory is canceled is subtracted from a time step f of the forward trajectory at which collision is expected, $s_{-B}$ represents a state value in a step B of a backward trajectory and represents a state value of the current target waypoint when the backward trajectory is not present, and d represents a time step at which the forward trajectory is canceled.

7. The method of claim 5, wherein modifying of the trajectory in partial, a trajectory including the safe timed configuration region $Q_n^{safe}$ (m) is determined by increasing a time index corresponding to the last calculation point of the forward trajectory in which the safe timed configuration region $Q_n^{safe}$ (m) is present.

8. The method of claim 5, wherein modifying of the trajectory in partial, an identical input value is calculated for the robot.

9. A non-transitory computer-readable recording medium storing a program for employing an obstacle avoiding method in a state-time space of claim 1.

10. A computer-executable program stored in a non-transitory computer-readable recording medium, when executed by a computer of a robot, causes the computer of the robot to instruct the following arithmetic processing steps:
calculating a forward trajectory in a state-time space from a current location of a robot or a last calculation point of a previous forward trajectory to a current target waypoint by taking into account a state value (s) and a time value (time index n),
wherein a state value ($s_n$) in a state-time space, which is used when calculating the forward trajectory, includes a configuration value of a location and a bearing, and includes any one or a plurality of pieces of information selected from a steering angle, a velocity, and acceleration,
the forward trajectory is calculated on the basis of a safe timed configuration region $Q_n^{safe}$ (m) that is a safe space within a configuration region where collisions with static obstacles and dynamic obstacles are not present, wherein the obstacle avoiding method is performed by the computer:
in response to detection of the safe timed configuration region $Q_n^{safe}$ (m) not being presented so that collision is inevitable, determining that an inevitable collision state occurs, and
in response to detection of the inevitable collision state being occurred, canceling a part of the forward trajectory, and calculating a forward trajectory passing through an interim target so as to avoid the collision.

* * * * *